Patented July 3, 1934

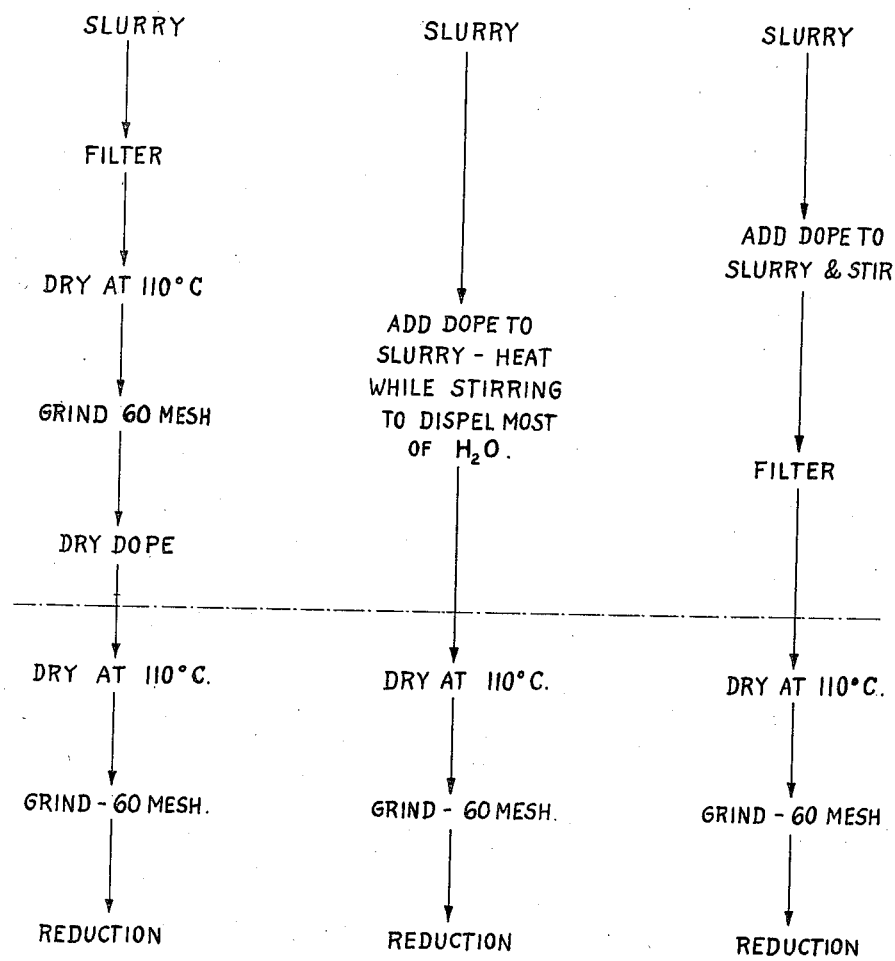

1,965,222

UNITED STATES PATENT OFFICE

1,965,222

METHOD OF DOPING TUNGSTIC OXIDE

Frank H. Driggs, Bloomfield, N. J., assignor to Westinghouse Lamp Company, a corporation of Pennsylvania Application November 1, 1933, Serial No. 696,221

4 Claims. (Cl. 176—132)

The invention relates to the preparation of a highly refractory metal and especially tungsten metal powder adapted to be processed into filaments which may be employed in incandescent lamps, or the like.

More specifically the invention is directed to the preparation of tungstic oxide adapted to be reduced to tungsten metal of the type that finds especial employment as the filament of an incandescent lamp. The type of filament that is desirable in electric devices of the above character should have non-sag characteristics and should not exhibit the deleterious characteristic of offsetting and sagging on continued burning.

The invention is especially concerned with the method of preparing tungsten metal having the above characteristics. Heretofore it has been generally known that a tungsten filament containing an exceedingly small percentage of potassium chloride and a like proportion of potassium silicate improves the non-sag and non-offsetting properties of the metal. These compounds are not added directly to the metal per se but are introduced at some stage of the processing when the tungsten is oxidized and prior to the time it is reduced to metallic form. These compounds customarily termed "dope" are generally added to tungstic oxide and this step is termed "doping".

Prior to my invention two methods have been proposed for "doping" and are generally known as "dry or hand doping" and "slurry doping". The "dry or hand doping" comprises taking the slurry formed after the tungstic oxide precipitation and washing the oxide.

After washing the precipitate substantially free from alkali metal chloride, formed during precipitation, the washed precipitate or slurry is vacuum filtered. The filter cake consisting essentially of tungstic oxide and water is heated until its temperature is elevated to 110° C. to 120° C. and maintained at this temperature until the water is completely driven off and there is left behind substantially dry $H_2WO_4$, tungstic oxide. The dry oxide is ground until it passes a 60 mesh screen. Thereupon, an alkali metal chloride and an alkali metal silicate, such as KCl and $K_2SiO_3$ are added as a water solution to the dry oxide. The quantity of solution is just sufficient in quantity to cause the mass of tungstic oxide to which it has been added to become slightly moist.

The tungstic oxide only slightly moistened with the "dope" solution is stirred by hand to distribute the solution throughout the tungsten oxide to "dope" the same. The moist tungsten oxide is subjected to heat to elevate the temperature thereof to 110° C. to 120° C. to drive the water off and leave the "dope" behind in the oxide. The dried oxide is ground and then subjected to hydrogen reduction to reduce the tungsten to its metallic form. This particular process is disadvantageous in that it involves a high labor cost and in addition the "dope" is not as uniformly distributed throughout the tungsten oxide as is desirable.

The "slurry doping" method comprises taking the slurry formed after the tungstic oxide precipitation and washing has taken place to wash the alkali metal chloride formed during precipitation. A portion of the wash water is decanted therefrom and to this wet, thick slurry is added a suitable quantity of the "dope".

The "doped" slurry is placed in an evaporating pan which is heated to a temperature of about 110° to 120° C. While in this pan the mass is continually stirred to distribute the "dope" throughout the mass. The pan is heated and the mass is stirred until the mass of tungsten oxide is in such a state that lumps of tungsten oxide formed are not moist to the touch and no water will migrate from one lump to another. However some of these lumps contain a water solution of the dope within the interior of the dry shell of oxide of each lump. This water must be driven off and it is accomplished by removing the lumps from the pan and placing them in an oven at a temperature of 110° C. to 120° C. whereby all of the water is driven from the oxide to completely dry the same. Thereafter the dried oxide is ground so that it passes a 60 mesh screen and then is subjected to a reduction step to reduce the mass to metallic tungsten.

Although with this method it is possible to obtain a fair distribution of the "dope" throughout the oxide, which advantage does not always exist when the dry doping is carried out, it has the disadvantage of requiring additional apparatus over that generally found in a tungsten preparation plant. In addition the "slurry doping" has the disadvantage of the danger of non-uniform distribution of the "dope" throughout the oxide because even with constant stirring it is difficult to prevent excessive localized evaporation together with further adsorption of "dope" at those points with consequent concentration of dope at these points.

The drawing in flow diagrams I and II illustrates the methods employed prior to my invention and flow diagram III illustrates the method that I employ in accordance with my invention.

My improved method of adding doping compounds, to the best of my knowledge, has not been suggested or practiced before my invention. In order that the quantity of "dope" may be properly controlled, so that the cost of preparing the doped metal shall be as low as possible, so that no additional apparatus over that generally employed shall be required, and so that the "dope" shall be uniformly distributed throughout the mass of material to be treated I have made the following invention.

These and other objects of my invention will be readily apparent from the following description and claims.

The first step generally followed in the preparation of tungsten is to treat a suitable tungsten containing ore so as to transform the tungsten contained therein into a water soluble compound of tungsten, such as potassium tungstate. For my purposes the ore is so treated with potassium hydroxide that I obtain substantially pure crystals of potassium tungstate. The potassium tungstate may be in its solid crystalline form having been derived from the treatment of the ore. Water is then added to the potassium tungstate to dissolve the same. Thereafter the potassium tungstate solution of the proper concentration is added to hydrochloric acid of predetermined concentration until the concentration of the hydrochloric acid has been reduced to a certain value. This reaction is carried out in a precipitating tank. The potassium tungstate reacts with the hydrochloric acid to produce tungstic oxide and potassium chloride according to the following equation:

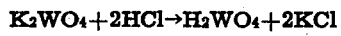

$$K_2WO_4 + 2HCl \rightarrow H_2WO_4 + 2KCl$$

The particle size of the tungsten obtained from a mass of tungstic oxide depends upon the concentration of the hydrochloric acid used and upon other factors described in my copending application Serial No. 663,182 filed March 28, 1933. The teachings of my invention expressed in said application may be followed in preparing the tungstic oxide which may be processed according to my invention to be herein fully described.

The precipitating tank now contains a slurry consisting of hydrochloric acid, tungstic oxide and potassium chloride. The slurry is allowed to stand and the tungstic oxide settles to the bottom of the precipitating tank. The supernatant liquor is then decanted therefrom. Thereafter clear water is added to the precipitate or sludge to thin the same to a slurry consistency. The slurry is agitated, the precipitate is allowed to settle and the supernatant liquor is decanted therefrom. Clear water additions, agitations, settlings and decantations are continued until most of the potassium chloride is washed from the precipitate or sludge. The sludge may be washed between about five and ten times in order that the tungstic oxide is substantially free from KCl. By the term substantially free, I mean the KCl content is less than about 0.1%. The supernatant liquor of the last washing is decanted therefrom leaving behind a sludge which may be easily stirred. A small sample of the supernatant liquor is analyzed for KCl content so that the KCl strength of the liquid in contact with the tungstic oxide sludge is ascertained.

A sample of the sludge is so treated that the quantity of the liquor absorbed or adsorbed by the precipitate, after the same has been vacuum filtered, is ascertained. Knowing the per cent of KCl in the liquor, and the water or liquor absorption or adsorption factor of the vacuum filtered precipitate, I may readily determine the amount of KCl that is adsorbed or absorbed by the tungstic oxide precipitate. After washing the tungstic oxide sludge or precipitate 5 or 10 times, I have found that the quantity of KCl absorbed or adsorbed by the tungstic oxide is less than that which I find necessary for my purposes. The concentration of hydrochloric acid in said liquor at this stage is exceedingly low and so low that the addition of an alkali silicate would result in the precipitation of silicic acid therefrom in a highly dispersed state.

In the preparation of tungsten filament that have non-sag and non-offsetting characteristics I have found it advisable to so control the KCl content that the per cent of KCl in the dried oxide shall be between about 0.3% to 0.8% and preferably about 0.5%. Being aware of the KCl concentration of the slurry and the amount of liquor absorbed by the particular oxide in said liquor of the slurry after the last washing, I now add a sufficient quantity of KCl to the slurry so that the amount of KCl absorbed or adsorbed by the oxide shall be between about 0.3% to 0.8% and preferably about 0.5% by weight of dry filtered tungstic oxide. To the slurry I also add a predetermined quantity of an alkali silicate, such as sodium or potassium silicate, or an alkali borate.

The amount of silicate should be such that the oxide will contain on drying between 0.2% to 0.6% $SiO_2$. The "doped" slurry is vigorously agitated so that the "dope" including both the KCl and the silicate or borate may be completely and uniformly distributed throughout the entire mass. The slurry is then allowed to stand for a period of time to insure "dope" adsorption or absorption by the oxide. Thereafter, the sludge or slurry is placed on a suction filter to remove the easily removable water therefrom. After this step, the filter cake of "doped" oxide is heated to a temperature of about 110° C. to drive all the water from the solution carrying the "dope". This step is the drying step which when carried out leaves behind the "dope" and $H_2WO_4$ without any water present.

The heated cake free from this water now contains the proper amount of and about 0.5% by weight of KCl and also the proper amount of silicate or borate because of the particular method hereinbefore described for controlling the additions thereto. From the foregoing it is apparent that my process does not require the expense of additional apparatus over that generally found in the ordinary tungsten process plants. Also by my method the "dope" besides being nicely controlled as to quantity is uniformly distributed through the entire mass. After the cake is sufficiently dried it is subjected to the usual hydrogen reducing, sintering and the like operations for the preparation of a tungsten bar which may be worked into filaments finding particular employment as non-sag and non-offsetting incandescent lamp filaments.

Although the invention has been described with some particularity it is to be limited only by the prior art.

What is claimed:

1. The method of preparing a tungsten filament including treating a soluble alkali metal tungstate with hydrochloric acid to precipitate an oxide of tungsten, washing the precipitate thus formed to reduce the concentration of excess hydrochloric acid and an alkali metal chloride formed during said precipitation, the washing being continued until the quantity of alkali metal chloride absorbed or adsorbed by said oxide is less than a predetermined quantity, forming a slurry of said oxide, adding a sufficient quantity of alkali metal chloride for increasing the amount of alkali metal chloride in the slurry, the amount of alkali metal chloride added being dependent on the adsorption or absorption factor of the particular tungsten oxide, the amount of alkali metal chloride absorbed or adsorbed by said oxide before the alkali metal addition, and the amount of alkali metal chloride required in a dry tungsten oxide, distributing the alkali metal chloride throughout the mass of said tungsten filtering said tungsten oxide, then drying the same.

2. The method of preparing a tungsten filament including treating a water soluble potassium tungstate with hydrochloric acid to precipitate an oxide of tungsten, washing the precipitate thus formed to reduce the concentration of excess hydrochloric acid and potassium chloride formed during said precipitation, the washing being continued until said tungsten oxide if dried analyzes less than about one tenth of one percent by weight, adding a predetermined quantity of potassium chloride and forming a slurry, stirring the slurry, suction filtering the oxide and drying the same.

3. The method of preparing a tungsten filament including adding potassium tungstate to hydrochloric acid to precipitate tungsten oxide, the hydrochloric acid being present in excess, washing the precipitate by water additions, stirrings, and decantations until the tungsten oxide if dried analyzes less than about one-tenth of one per cent potassium chloride, adding potassium chloride and forming a slurry, the amount of potassium chloride added being sufficient to increase the amount of potassium chloride in the tungsten oxide of the slurry which if dried analyzes about three-tenths to about eight-tenths of one percent potassium chloride, agitating the slurry, then filtering the same, thereafter drying the filtered tungsten oxide.

4. The method of preparing a tungsten filament including adding potassium tungstate to hydrochloric acid to precipitate tungsten oxide, the hydrochloric acid being present in excess, washing the precipitate by water additions, stirrings and decantations to reduce the concentration of hydrochloric acid and potassium chloride formed during said precipitation until the hydrochloric acid concentration is very low and until the tungsten oxide if dried analyzes less than one-tenth of one per cent potassium chloride, adding potassium chloride and potassium silicate and forming a slurry, the amount of potassium chloride added being sufficient to increase the amount of potassium chloride in the tungsten oxide of the slurry if dried to about five-tenths of one per cent, agitating and then suction filtering the slurry and thereafter drying the same.

FRANK H. DRIGGS.